United States Patent [19]

Macovski

[11] 3,908,193

[45] Sept. 23, 1975

[54] COLOR TELEVISION ENCODING AND DECODING SYSTEM

[76] Inventor: Albert Macovski, 4100 Mackay Dr., Palo Alto, Calif. 94306

[22] Filed: Oct. 9, 1973

[21] Appl. No.: 404,775

Related U.S. Application Data

[63] Continuation-in-part of Ser. No. 309,908, Nov. 27, 1972, abandoned.

[52] U.S. Cl. .................................................. 358/47

[51] Int. Cl.² .......................................... H04N 9/07

[58] Field of Search ............... 358/5, 44, 47, 55, 45; 350/162 SF

[56] References Cited

UNITED STATES PATENTS

| | | | |
|---|---|---|---|
| 3,530,233 | 9/1970 | Chai et al. | 358/55 X |
| 3,566,017 | 2/1971 | Macovski | 178/5.4 |
| 3,585,286 | 6/1971 | Macovski | 358/47 |
| 3,647,945 | 3/1972 | Hannan | 358/44 X |
| 3,681,519 | 8/1972 | Larsen et al. | 358/55 X |
| 3,715,461 | 2/1973 | Hanlon | 350/317 X |

*Primary Examiner*—Robert L. Griffin
*Assistant Examiner*—Mitchell Saffian

[57] ABSTRACT

Color information is encoded on a photosensitive surface by passing the image through an encoding filter. This encoding filter consists of two color difference gratings of different spatial frequencies whose optical beat frequency pattern is modulated by a color. In the decoding process the encoded image is scanned and the beat frequency signal is used to determine the polarity of the two color difference signals.

35 Claims, 12 Drawing Figures

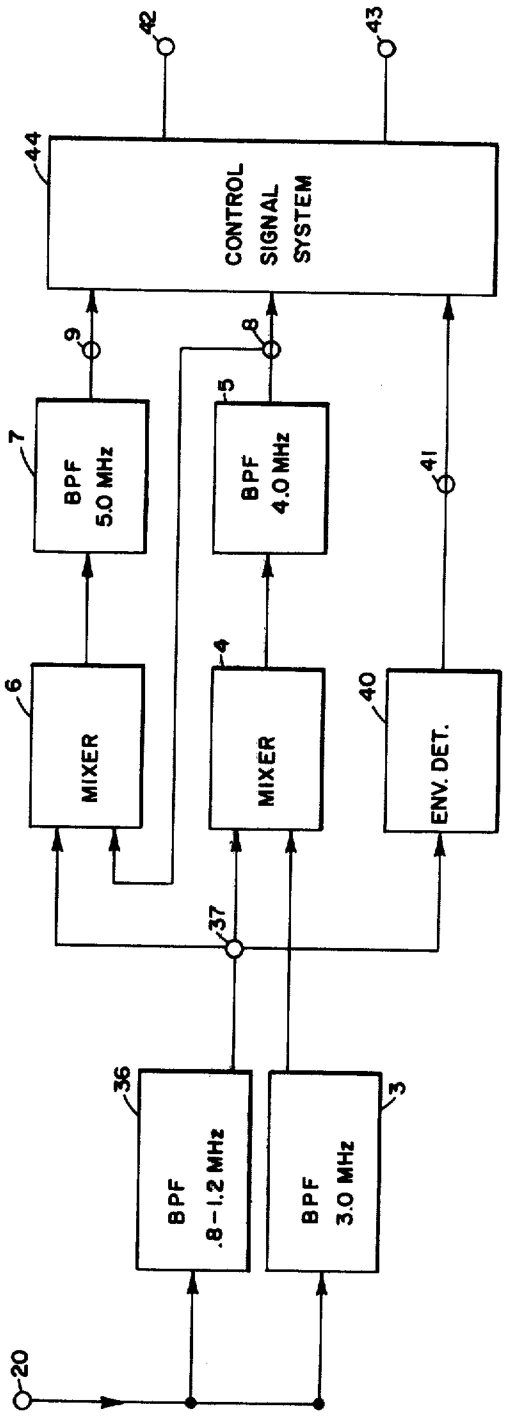
FIGURE IA

COLOR TELEVISION ENCODING AND DECODING SYSTEM

CROSS-REFERENCES TO RELATED APPLICATIONS

This is a Continuation-in-Part application which includes a substantial portion of application Ser. No. 309,908 filed Nov. 27, 1972, now abandoned, by the same inventor and having the same title.

BACKGROUND OF THE INVENTION

1. Field of Invention

This invention relates to color television recording and reproducing systems. In a primary application the invention relates to the use of a single television camera tube as a color television camera. In another application, color information is encoded onto black and white film and decoded using a scanner.

2. Description of Prior Art

One of the earliest patents on encoding color information onto a single television camera tube in U.S. Pat. No. 2,733,291 granted to R. D. Kell on Jan. 31, 1956. An improved color television encoding system is described in U.S. Pat. No. 3,378,633 granted to A. Macovski on Apr. 16, 1968. This latter system is presently being marketed as the Spectra-Plex vidicon, RCA-4445. This system provides for two of the primary colors, red and blue, amplitude modulating two carriers at different frequencies. These signals, along with the baseband luminance signal, which is responsive to all three colors, provides the desired color information. The two carriers must be fully and accurately resolved over the entire face of the camera tube. A change in the response to either carrier due to defocusing, astigmatism, or clipping will reflect itself as a distortion of the grey scale balance, so that neutral areas will become colored.

In an effort to make these cameras relatively immune to defocusing, non-linearities, and other errors, systems have been designed which provide carriers which are modulated by color difference signals rather than color signals. These color difference signals are zero in neutral areas and only exist in colored areas. A change in their relative amplitude affects the color saturation which is relatively non-critical. An error in these signals cannot affect the grey scale balance or cause a color to appear in an otherwise neutral area. In addition, color difference signals, being suppressed carrier, provide increased dynamic range and thus an improved signal to noise ratio. Color difference signals, unlike color signals, are bipolar so that both the amplitude and polarity of these signals must be determined.

A number of methods have been devised for decoding the polarity of the color difference carrier signals. In U.S. Pat. No. 3,419,672, granted to A. Macovski on Dec. 31, 1968 and second harmonic of the carriers is used to determine their polarity. This requires additional resolution on the part of the camera tube in order to resolve the second harmonic signal. In U.S. Pat. No. 3,566,016 granted to A. Macovski on Feb. 23, 1971 an additional grating signal, over and above the two color difference gratings, is used to decode the polarity of the color difference signals. This additional grating requires additional resolution on the part of the camera tube and an exact integral relationship must be maintained between the reference and color gratings.

Slight phase errors in the reference grating become color errors.

Many of the camera systems described, such as that of U.S. Pat. No. 3,378,633, issued to A. Macovski, can also be used for encoding color information onto a substrate, such as photographic film, by placing the encoding filter alongside the film. Either a black and white television camera, or a flying-spot scanner is used to read out the recorded information so that it can be decoded into appropriate color signals.

SUMMARY OF THE INVENTION

An object of this invention is to provide apparatus for encoding and decoding color difference information on a sensitized surface.

It is also an object of this invention to provide a method of resolving the polarity ambiguity of color difference information without requiring additional reference information.

Briefly, in accordance with the invention an encoding filter is provided consisting of two gratings of different spatial frequencies. Each grating has alternate stripes of two different subtractive primary colors. Colored images are recorded through this encoding filter onto a sensitized surface and then scanned. Band-pass filters are used to separate the two color difference signals and their beat frequency signal. This beat frequency signal is amplitude modulated by a color signal and is used to unambiguously determine the correct polarity of both color difference signals.

BRIEF DESCRIPTION OF THE DRAWINGS

For a more complete disclosure of the invention, reference may be made to the following detailed description of several illustrative embodiments thereof which is given in conjunction with the accompanying drawings, of which:

FIG. 1*a* is a block diagram illustrating an alternate embodiment of the invention whereby two components of the beat frequency are used;

DESCRIPTION OF THE PREFERRED EMBODIMENT

Figure 1:
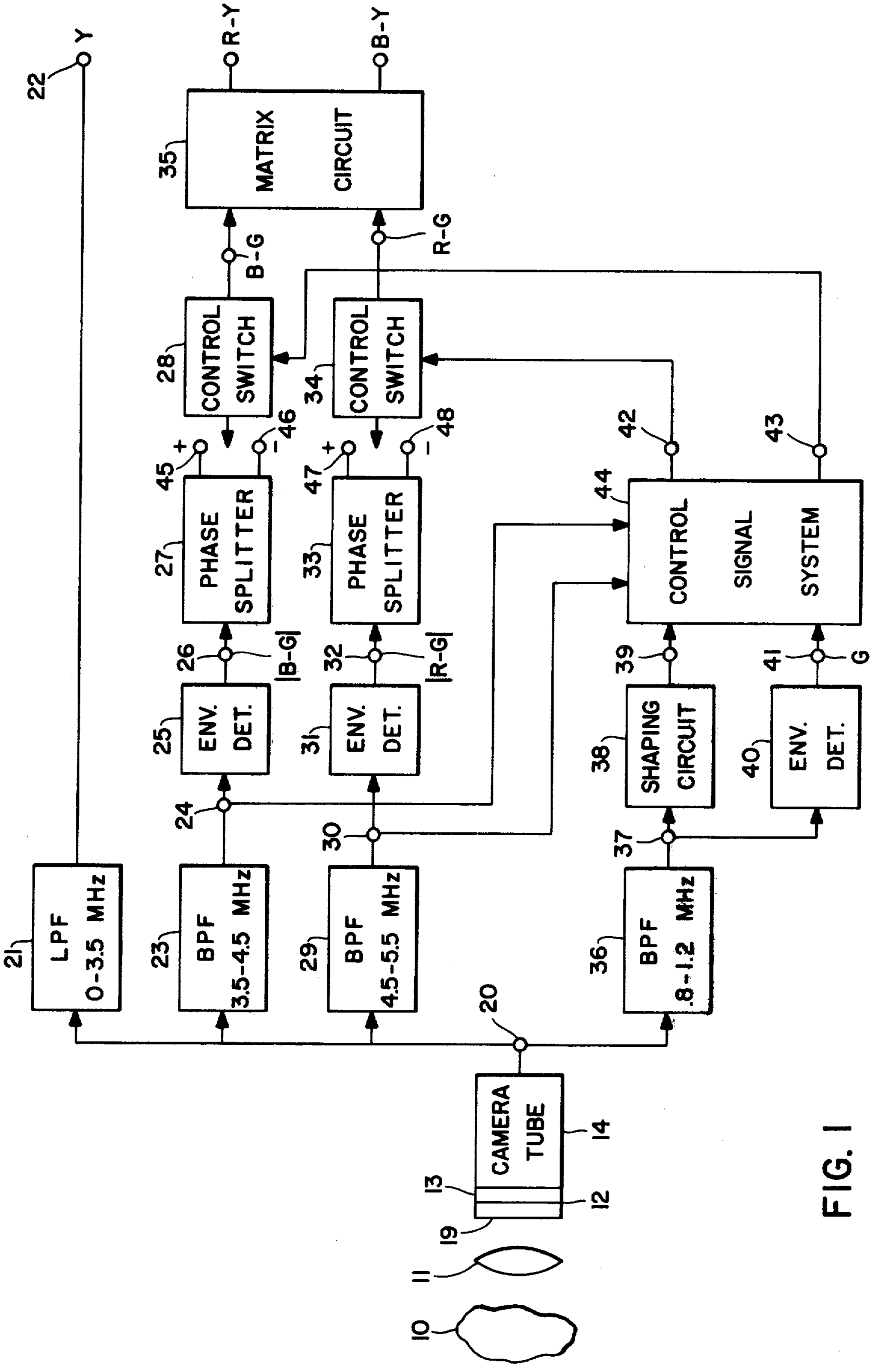
FIG. 1 is a block diagram illustrating an embodiment of the invention which uses a single camera tube.

An understanding of the broad aspects of the invention may best be had by reference to FIG. 1 of the drawings. The colored scene 10 is imaged, using lens 11, through encoding filter 12 onto the photocathode 13. Filter 19 is a color correction filter and will be described subsequently.

Figure 2:
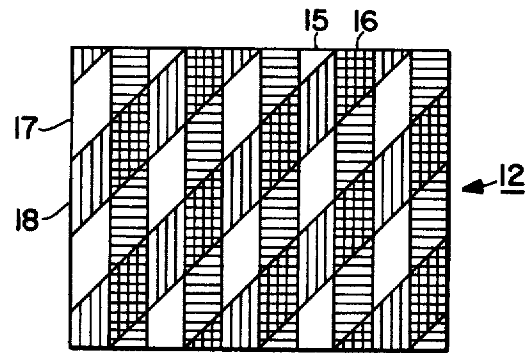
FIG. 2 is a greatly enlarged portion of an encoding filter.

Referring to FIG. 2, a blowup is shown of a color encoding filter 12. This filter is a combination of two gratings, one containing alternate stripes 15 and 16 and the other alternate stripes 17 and 18. The basic requirements of each pair of stripes is that they transmit white light equally. Specifically, they transmit white light equally taking into account the color sensitivity of the camera itself and all other color modifying filters in the system. Therefore it is not necessary that the stripe filters themselves, taken in isolation, transmit white light equally but that the overall response of the system be equal for each stripes when illuminated by white light. The projections of each stripe onto the photosensitive surface produces equal response due to white light. Thus, when scanned, the gratings will produce no signal in neutral areas but will produce an output only in the presence of color. The amplitude and polarity of the signal produced will depend on the particular color and the extent to which the alternate stripes transmit that color differently. The two gratings must be of different spatial frequencies. Spatial frequency is a two-dimensional vector concept which may be viewed as having vertical and horizontal components or alternatively having a magnitude and an angle. Thus two gratings having the same periodicity but at a different angle have different spatial frequencies. Similarly two gratings at the same angle and with different periodicities have different spatial frequencies. A preferred choice for the stripes are the subtractive color primaries, cyan, yellow and magenta. One of the stripe colors can be common to both gratings. Thus, in one embodiment of the encoding filter 12 stripes 15 and 16 can be magenta and cyan respectively, while stripes 17 and 18 can be magenta and yellow, respectively. Since magenta transmits red plus blue and cyan transmits green plus blue, the grating formed by stripes 15 and 16 will encode the R-G color difference signal since blue is transmitted equally by both stripes. Similarly the grating formed by stripes 17 and 18 will encode the B-G color difference signal. These two signals provide all of the desired color difference information and, as will be subsequently shown, can be combined, using a matrix, into any of the more standard color difference signals such as R-Y and B-Y or I and Q.

The process of encoding is essentially an amplitude modulation of a spatial frequency carrier of the form $a(x) \cos u x$ where $a(x)$ is the amplitude modulation function and $u$ is the angular spatial frequency in the $x$ direction of a vertical grating. When this amplitude modulated grating is scanned, it is equivalent to convolution with a delta function moving at the velocity $v$. The resultant signal $f(t)$ is given by $$f(t) = \int a(x) \cos u x \, \delta(x-vt)\, dx = a(vt) \cos u v t$$

where $a(vt)$ is the temporal amplitude modulation function and $\cos u v t$ is the resultant electrical carrier frequency whose angular frequency $W = u v$.

To decode the signals formed by scanning the encoded information it is necessary to know both the amplitude and polarity of the color difference signals. Signals of this type are often referred to as suppressed carrier waves since the carrier amplitude is zero in neutral areas and becomes either positive or negative for different colors. The polarity determination is made using the optical beat frequency or difference frequency between the two gratings. The amplitude color characteristics of the optical beat frequency is determined by the product of the two gratings. This product, for the subtractive color primaries used in the illustration is green, as shown by:

$$(m-c)(m-y) = r+b-b-r+g = g$$

The small letters indicate a filter characteristic; magenta, cyan and yellow. When the expression is multiplied out, each product term is replaced by the primary colors that are transmitted. Thus cyan times magenta transmits blue, and magenta times magenta transmits red plus blue. A similar result can be obtained by the equivalent operation of obtaining the product of $(r-g)$ and $(b-g)$. Thus, the beat frequency pattern is amplitude modulated spatially by the green information. The significance is that the phase of this beat frequency pattern will remain unchanged since it is being modulated by a positive quantity. It is required property of the encoding filter that the beat frequency pattern be modulated by positive values of the colors so that its polarity will never change.

For the general case, assume that the color transmissions of the stripes of the first grating are $f_1$ and $f_2$ while those of the second grating are $f_3$ and $f_4$. Each of these transmissions can be decomposed into $r$, $g$, and $b$ transmission values. For example $f_1$ can be decomposed into $r_1 + g_1 + b_1$. The optical heat frequency amplitude is then given by $$(f_1 - f_2)(f_3 - f_4) = f_1f_3 + f_2f_4 - f_2f_3 - f_1f_4$$

When each of these are decomposed into their $r$, $g$, and $b$ values the resultant must include only positive values to insure that, for any color scene, the polarity will never change.

Returning to FIG. 1, the color encoded scene stored on the photocathode 13 is scanned in camera tube 14 to produce a composite signal 20. This composite signal is filtered by low pass filter 21 to produce a luminance or Y signal representative of the brightness of the scene. The bandwidth of this filter is normally a compromise between the visibility of the color carriers and the desired resolution. If a higher resolution camera is used whereby the carriers can be of higher frequency, they can be out of the required luminance bandwidth and be attenuated as desired. A first band pass filter 23 is used to isolate the lower frequency color difference signal 24, (B-G) cos $W_1$t, where $W_1$, is the angular frequency formed by scanning the B-G grating, in this example corresponding to 4.0 MHz. This signal is envelope detected using envelope detector 25 to form |B-G| the absolute amplitude of this color difference signal. What is now required is the correct polarity of this signal. Phase splitter 27 forms positive and negative values of this signal, 45 and 46. Control switch 28, in response to control signal 43, selects the correct polarity to provide the correct B-G signal. The R-G color difference signal occurring at $W_2$, corresponding to 5.0 MHz in this example, is handled in a like manner by band pass filter 29 to provide 30, (R-G) cos $W_2t$. This signal is envelope detected using 31 and using phase splitter 33, two polarities of the magnitude of |R-G| are provided. The proper polarity is selected by control 34 in response to control signal 42. Having formed B-G and R-G in the correct polarities, a variety of matrix circuits can be used to convert these signals into those more commonly used. For example, one alternative not shown, is to combine these signals with that of the Y signal to form the R, G, and B signals which emerge from conventional three tube camera systems. A more common embodiment is to employ matrix circuit 35 to convert these signals into the R-Y and B-Y color difference signals which are used to modulate the color subcarrier in the U.S. color television standards. Assuming that the luminance signal Y is made up as follows:

$$Y = 0.6G + 0.3R + 0.1B$$

then the correct operation for matrix circuit 35 would be:

$$R\text{-}Y = 0.7(R\text{-}Y = 0.7(R\text{-}G) - 0.1(B\text{-}G)$$

$$B\text{-}Y = 0.9(B\text{-}G) - 0.3(R\text{-}G)$$

Alternative matrix schemes could be used, in a known manner, to produce the I and Q color difference signals having dissimilar bandwidth as specified in the U.S. color television standards.

The color correction filter 19 was previously alluded to. It is an overall color filter for compensating for the various color characteristics of the encoding filter and the color sensitivity of the photosensitive surface 13 to insure that the alternate stripes of both gratings transmit light light equally as measured by the output 20 of the camera tube 14 or the response of the photocathode 13. For example, assume that the photocathode 13 has a flat response over the entire visible spectrum. In that case the color correction filter or overall color filter 19 must compensate for the effect of the average color transmission of each color difference grating on the other. For example, the grating formed by strips 15 and 16, which in the example given were magenta and cyan, on the average, passes blue with no attenuation and green with 50% transmission since green is absorbed by the magenta stripe 15 and transmitted fully by the cyan stripe 16. This grating would therefore distort the output of the B-G encoding grating, formed by magenta stripe 17 and yellow stripe 18, unless corrected by this correction filter 19. To properly correct this problem the correction filter 19 should transmit the green unattenuated and the blue with a 50% transmission. In like manner the average color transmission of the encoding grating formed by 17 and 18 transmits red unattenuated and green with 50% transmission. Thus, to correct the distortion of both the B-G and R-G signals the correction filter 19 should transmit red and blue with 50% transmission and green unattenuated. These values should be modified, however, according to the color sensitivity of the photosensitive surface 13.

In the embodiment of FIG. 1, the polarity of the color difference signals are determined by the beat frequency signal itself. To accomplish this, the heat pattern must bear an integral relationship with each of the color difference gratings so that the phase of the beat frequency signal will correspond to specific colors on each of the color difference gratings. Thus the frequencies of both modulated color difference signals must be an integer times the beat frequency. This relationship can be expressed as $$n(W_2 - W_1) = W_2$$

where $n$ is any integer. This relationship automatically insures that $W_1$ will also be integrally related to the beat frequency ($W_2 - W_1$). This is shown by manipulating the above relationship to obtain $$(n-1)(W_2 - W_1) = W_1$$

where $(n-1)$is also an integer. The integral relationship is required to provide a constant phase relationship between the beat frequency signal and the modulated color difference signals so that the sampling of the modulated color difference signals will occur at a fixed phase relationship. Of course, as was previously pointed out, the polarity of the beat frequency signal will remain unchanged. In order to maintain a fixed phase relationship over the entire field, the two color difference gratings must be parallel to each other. Thus, stripes 17 and 18 in FIG. 2 must be parallel to stripes 15 and 16 or vice versa. The problem with this arrangement is that the beat frequency pattern between the two gratings can become visible since it is of a relatively low spatial frequency. If the camera has resolution capabilities well beyond that required, the frequencies can be made high enough to minimize the visibility of the beat frequency pattern. In addition the colors of the gratings can be chosen to minimize the amplitude of this beat pattern.

A third band pass filter, 13, is used to isolate the modulated beat frequency signal 37, G cos $(W_1\text{-}W_2)t$. In this particular example the beat frequency occurs at 1.0 MHz. This signal is passed through a shaping circuit 38 which generates a series of constant amplitude narrow pulses 39 which correspond in time to the peak of the signal 37, G cos $(W_1\text{-}W_2)t$. These pulses, as previously pointed out, bear a specific phase relationship to the color difference signals since the gratings are parallel and have a specific integral relationship with each other. The peak can be made to correspond with specific regions of each color difference grating and thus specific phases of each color difference signal. Thus sampling the modulated color difference signals 24 and 30 using pulse sequence 39 will determine the polarity of the color difference signals. This is accomplished in control signal system 44 whereby control signals 42 and 43 are generated to actuate control switches 28 and 34 to the correct polarity position. In addition to the shaped pulse sequence 39 and modulated color difference signals 24 and 30, a G signal 41 formed by envelope detecting the modulated beat frequency signal 37 with envelope detector 40 is applied to the control signal system 44.

Figure 3:
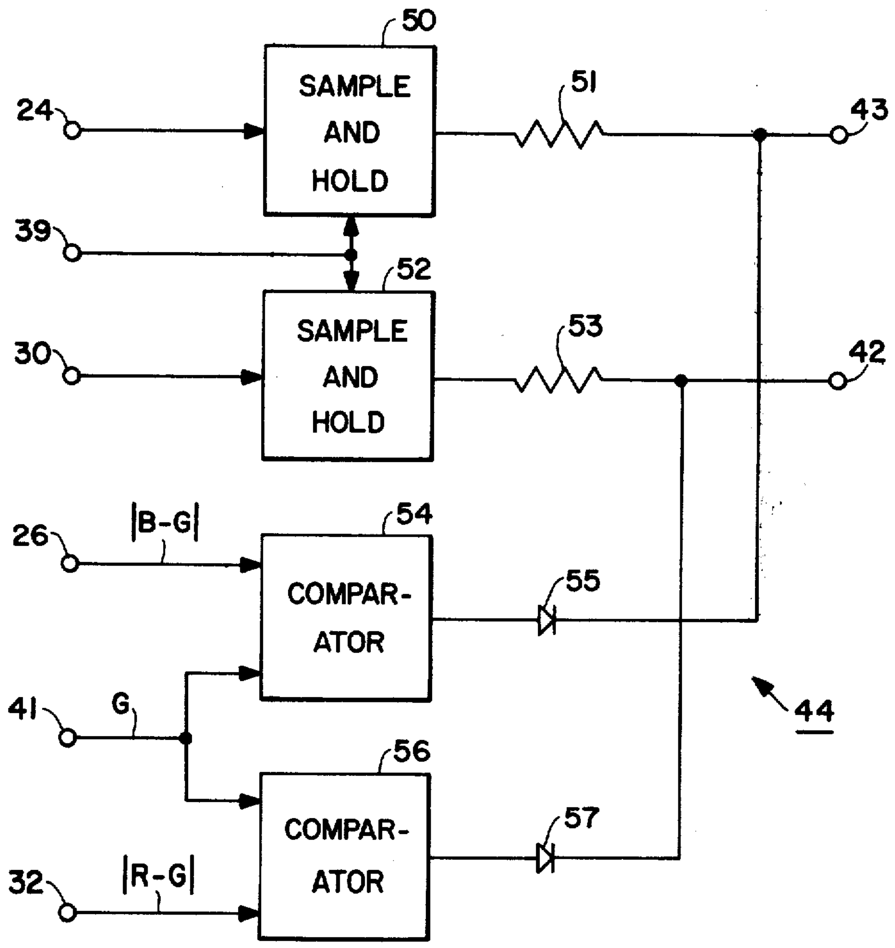
FIG. 3 is a block diagram illustrating an embodiment for decoding the polarity of the color difference signals.

FIG. 3 is a block diagram of an embodiment of a control signal system 44. The pulse sequence 39, the sampling input signal, is used to sample the two modulated color difference signals 24 and 30, the sampled input signals, to determine their polarity. This polarity information, the sampled output, is stored or held and applied via resistors 51 and 53 to control switches 28 and 34 shown in FIG. 1. It is important to note that the accuracy requirement of this sampling circuit is quite low since only the polarity information is required. Thus phase errors cause little or no damage compared to that of a synchronously detected color carrier. The difficulty with this sampling system, however, occurs when the relative amplitude of the green becomes very low so that the resultant sampling pulse becomes noisy. In that case, a simple mathematical relationship is used to define the polarity of the color difference signal. If the absolute value of the color difference signal exceeds green, in this example, the color difference signal must be positive. Thus if |B-G| > G then B-G is positive and similarly if |R-G|>G then R-G is positive. As shown in FIG. 3, this relationship is used to make the polarity decision in those instances where the relative amplitude of the green, or whatever signal is amplitude modulating the beat frequency signal, is low. A comparator 54 is used to compare the relative amplitude of the absolute value of the color difference signal 26, |B-G| and that of 41, G. If G is larger, the output is negative and this prevents conduction of diode 55. If |B-G| is larger the positive output is coupled through diode 55 to provide the B-G control signal 43. It thus overrides the output of the sample and hold system 50 which might, under these conditions, be noisy. In identical fashion 32, |R-G| and 41, G are compared in comparator 56 and coupled through diode 57 to form the control signal 42.

Figure 4:
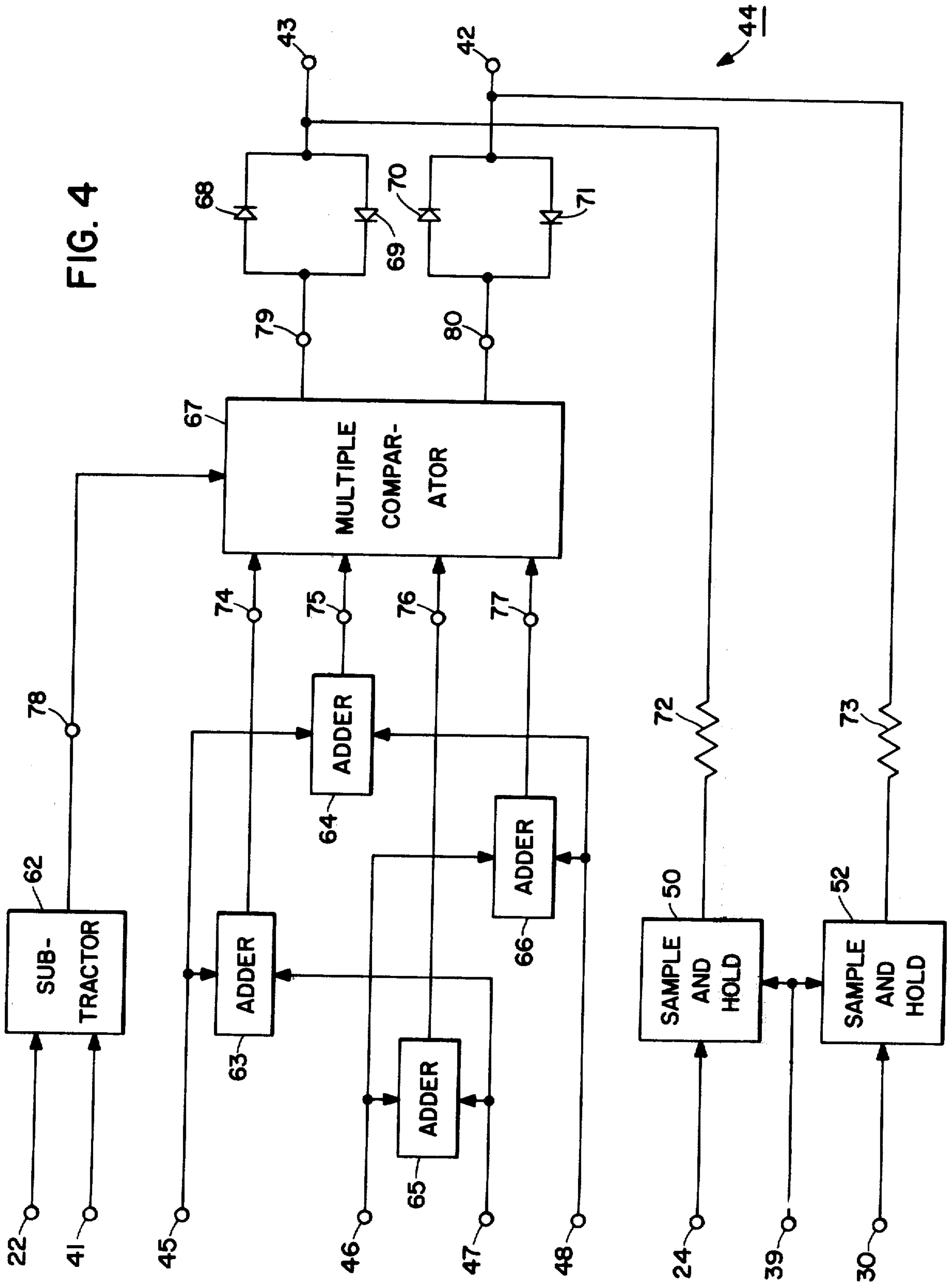
FIG. 4 is a block diagram illustrating another embodiment for decoding the polarity of the color difference signals.

FIG. 4 shows another embodiment of the control signal system 44. In this arrangement five additional signals are included in the control signal system 44. These are the Y signal 22, both polarities, 45 and 46, of |B-G|, and both polarities, 47 and 48, of |R-G|. This embodiment makes use of the relationship:

$$Y\text{-}G = k_1(R\text{-}G) + k_2\,(B\text{-}G)$$

that is, the difference between Y and G is a weighted sum of the two color difference signals. This signal 78 is produced by subtractor 62. The value of the constants $k_1$ and $k_2$ depend on the makeup of the luminance signal. In the case of where $Y = 0.6G + 0.3R + 0.1B$, $k_1 = 0.3$ and $k_2 = 0.1$. In the symmetrical case where $Y = ⅓ (R+G+B)$, $k_1 = k_2 = ⅓$. For simplicity, this latter case will be assumed in this illustrative example. Thus Y-G becomes proportional to the sum of the color difference signals. When only the absolute values of the color difference signals are known, their sum can have four possible values; the sum of the two positive values, the two negative values, one positive and one negative, and vice versa. In this embodiment all four of these possible sum values are made using adders 63, 64, 65, and 66 to add the positive and negative values of |B-G| and |R-G| in the four possible combinations. In multiple comparator 67 the actual sum of (R-G) and (B-G), 78, produced by Y-G in subtractor 62 is compared with the four possible sums in multiple comparator 67. This multiple comparator finds which sum is closest in value to signal 78. This then determines the polarities of both color difference signals by finding the polarities of the pair which produces the correct sum. Signals 79 and 80 are the control signals for the B-G and R-G control switches produced by finding the combination which produced the correct sum. This would be the entire control signal system were it not for the ambiguity in the region where $k_1\,(R\text{-}G) + k_2\,(B\text{-}G\,) = 0$. This condition is satisfied when (R-G) is positive and (B-G) is negative and vice versa. Thus, the outputs of adders 64 and 65 will both be zero and both equal to the Y-G signal 78. In this ambiguous signal situation a null output is present at the output signals 79 and 80 from multiple comparator 67. In this signal region the sample and hold arrangement previously shown in FIG. 3 is used for the polarity determination. In the region of ambiguity a diode pair is used to disconnect the output from the multiple comparator so that the sample and hold output will dominate the control signals. For example, assume the camera is scanning an area where $R = 0.6$, $G = 0.5$, and $B = 0.4$. In this region, since $(R\text{-}G) + (B\text{-}G) = 0$, the multiple comparator cannot unambiguously determine the polarities of the color difference signals. In that case outputs 79 and 80, rather than provide the positive or negative control signals, produce a zero output. Diode pair 68 and 69, and 70 and 71, rather than using idealized diodes, are actual solid state or vacuum tube diodes which do not conduct until the forward bias on each diode exceeds somewhere between 0.5 and 1.5 volts. Thus each diode pair has a "dead zone" whereby no conduction takes place in the vicinity of zero output of signals 79 and 80. If it is required to increase this dead zone region, either additional diodes can be placed in series with each diode shown or a bias voltage can be added in series with each diode to further reverse bias each diode. In this region of signal ambiguity the positive or negative outputs of sample and hold circuits 50 and 52 are coupled through resistors 72 and 73 to become the control signals 43 and 42. The operation of the sample and hold circuits are exactly as previously described.

Figure 4A:
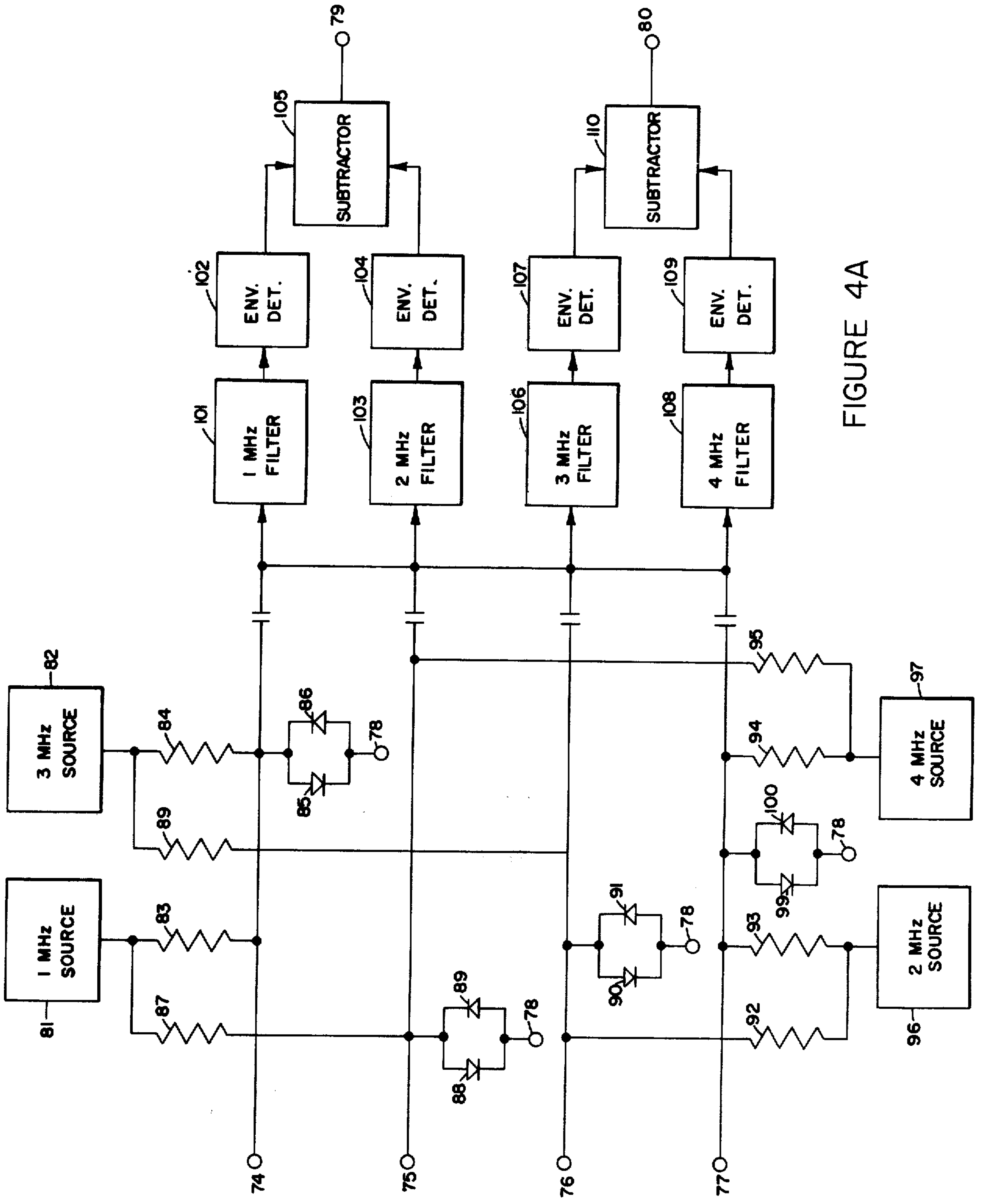
FIG. 4*a* is a circuit illustrating a representative embodiment of the multiple comparator of FIG. 4.

FIG. 4*a* is an illustrative example of a multiple comparator 67 shown in block form in FIG. 4. In this example the various sums of different polarities of the absolute values of the color difference signals 74, 75, 76 and 77 are compared to Y-G 78 and used to turn on and off four sinusoidal signal sources at different frequencies. In this example 1 MHz is used to represent positive values of B-G, 2 MHz for negative B-G, 3 MHz for positive R-G, and 4 MHz for negative R-G. These signals are coupled through resistors to diode pairs whose "dead zone" operation is similar to that described in the description of FIG. 4. In this case each diode pair will severely attenuate the high-frequency sinusoidal signal applied to it unless the particular sum signal, 74, 75, 76, or 77, is equal to or close to the Y-G signal 78. For example assume that both color difference polarities are positive so that $k_1\,|R\text{-}G| + k_2\,|B\text{-}G\,| + Y\text{-}G$. In this case the sum signal 74, containing both positive polarities of the color difference signals, will equal signal 78 while all others will be different. Thus diodes 85 and 86 will both be non-conducting while all other diode pairs, 88 and 89, and 90 and 91, and 99 and 100 will have one conducting diode since their associated signals will be different than signal 78 and cause conduction in one of the diodes. The 1 MHz and 3 MHz signals coupled to signal 74 through resistors 83 and 84 will not be attenuated since diodes 85 and 86 are non-conducting. The signals will be selected by filters 101 and 106 respectively, rectified by envelope detectors 102 and 107 respectively, to produce positive outputs at 79 and 80. These outputs will be coupled through the diode pairs to become control signals 43 and 42. The 2 MHz and 4 MHz signals do not appear since they are attenuated by conducting diodes. If both color difference signals were negative, sum signal 77 would equal signal 78 causing only the 2 MHz and 4 MHz signals to appear. These would be filtered by filters 103 and 108, detected by 104 and 109 and inverted by subtractors 105 and 110 to product negative control signals at 79 and 80. This same process takes place with one signal positive and the other negative where either signal 75 or 76 equals signal 78 and thus allows the corresponding two sinusoidal signals to pass on to the filters, envelope detectors and subtractors. In the case where signals 75, 76 and 78 are all zero, corresponding to $(R\text{-}G)+(B\text{-}G)=0$, both diode pairs 88 and 89, and 90 and 91 will be non-conducting. Thus all four signals will be transmitted to the filters and envelope detectors. The four envelope detector outputs will each cancel in subtractors 105 and 110 to produce zero outputs at 79 and 80. In this case, as previously described, the sample and hold circuits of FIG. 4 will dominate the control signals. The coupling capacitors shown are used to couple the high frequency sinusoidal signals to the filters without shorting out the color difference signals.

Figure 4B:
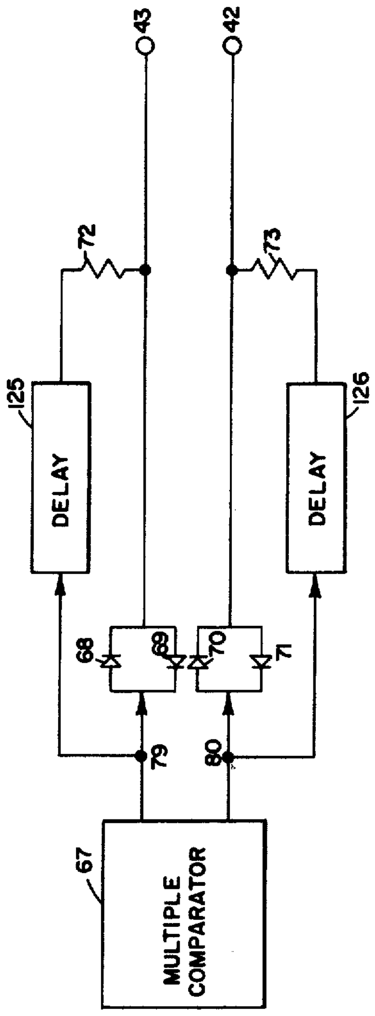
FIG. 4*b* is a block diagram illustrating an embodiment for overcoming the ambiguity in the system of FIG. 4.
Figure 4C:
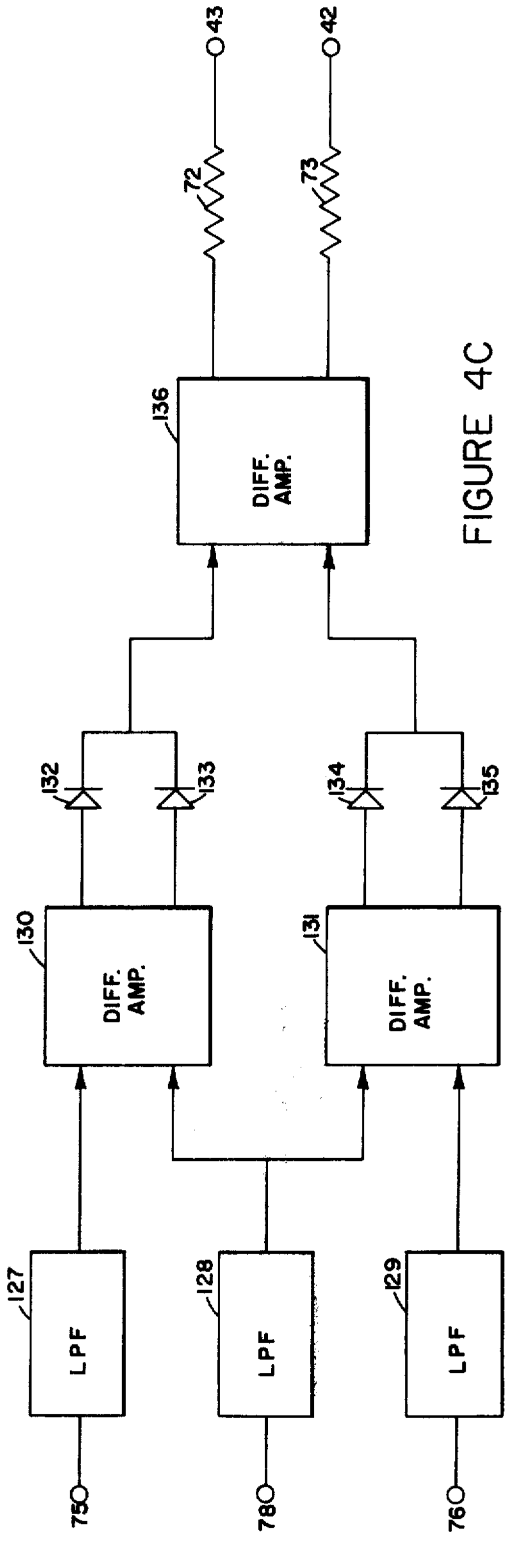
FIG. 4*c* is a block diagram illustrating an alternate approach to overcoming this ambiguity.

FIGS. 4*b* and 4*c* illustrate two embodiments of methods for resolving the ambiguity in the region where $(R\text{-}G)+(B\text{-}G)=0$. In these methods, however, the beat frequency signal is not used other than the use of its envelope for developing the green signal. Thus no specific relationships are required between the grating structures and they can be designed to minimize the visibility in the final display. In FIG. 4*b*, a delayed version of the signals are used to resolve the ambiguity. This method is based on the assumption that picture elements adjacent to the one causing the ambiguity are unlikely to have the exact same values yet are likely to be of the same polarity. Thus, when the outputs 79 and 80 of multiple comparator 67 provide a null indication the delayed version of these comparison signals will be coupled to the output via resistors 72 and 73. Since the diode pairs are open, this delayed voltage will determine whether control outputs 42 and 43 are positive or negative. The delays can be of picture element length, such as approximately 1.0 $\mu$ sec, in which case they represent the control signals at an adjacent picture element. Alternatively they can be the time of one scanning line in which case they represent the control signal from an element above the one causing the ambiguity, from the previous scanned line.

The embodiment of FIG. 4c provides a more accurate comparison between the signals in the region of the ambiguity. Thus signals 75 and 76 are compared to the reference signal 78 to determine which is closer in amplitude. These signals can first be low-pass filtered, as shown, using low pass filters 127, 128 and 129 to provide an improved signal to noise ratio for each signal. Although this reduces the resolution of the polarity decision it does not reduce the resolution of the final color difference signals. Signal 75 and signal 76 are each compared with 78, (R-G)+(B-G), in difference amplifiers 130 and 131. These amplifiers each produce push-pull outputs indicating the amplitude of the difference. The absolute value of the differences are extracted using diode pairs 132 and 133, and 134 and 135. These respond to the positive output only. These positive signals are then compared in difference amplifiers 136 to determine which is larger. The push-pull outputs of difference amplifier 136 indicates which of the two positive signals is greater by making 43 positive and 42 negative or vice versa. For example, assume that (R-G) is positive and has a magnitude slightly larger than (B-G) which is negative. Thus signal 78, (R-G) + (B-G) will be slightly positive and thus closer in amplitude to 76, $|R\text{-}G| - |B\text{-}G|$, than $|B\text{-}G| - |R\text{-}G|$. The output of the upper diode pair will then be larger than that of the lower diode pair because of the greater amplitude difference. The difference amplifier 136 will then produce a positive output on 42 and a negative output on 43 to affect the proper output polarities. These are coupled through resistors 72 and 73 and become effective only in the ambiguity region where diode pairs 68 and 69, and 70 and 71 are in their dead zone region as was previously discussed.

In most of the embodiments discussed thus far the color difference gratings were parallel to each other and bore an integral relationship to provide a fixed phase relationship between the beat frequency signal and the modulated color difference signals. It would be more desirable, from the point of view of minimizing the visibility of the beat frequency pattern, if the gratings could be at different angles as shown in FIG. 2. This can be accomplished if additional components of the beat frequency signal are used. Thus far the only component of the beat frequency between the two gratings which has been used is the beat between the fundamental components ($W_2$-$W_1$). Many other components exist which involve the harmonics of one or both of the two gratings. In particular the beat between the second harmonic of one grating and the fundamental component of the other can be used to provide synchronous sampling signals for both modulated color difference signals. For example the component of the beat frequency signal (2 $W_2$-$W_1$) can be combined with ($W_2$-$W_1$), the beat between the fundamental components. If each of these beat frequency components are isolated and mixed, their difference frequency will be at $W_2$. This signal at $W_2$ can then be mixed with ($W_2$-$W_1$) in another mixer to provide a difference frequency at $W_1$. A similar procedure can be used with the component of the beat frequency signal (2 $W_1$-$W_2$) to provide the two reference signals. In this case, however, the mixers isolate the sum frequencies rather than the difference frequencies. Thus signals synchronous with the color difference signals and of constant phase can be obtained. These can be used with synchronous or product detectors to unambiguously determine the polarity.

The general embodiment is shown in FIG. 1*a* which represents an alternative to FIG. 1. Here, in addition to band pass filter 36 for the beat frequency signal 37 between the fundamental components ($W_2$-$W_1$) at 1.0 mHz, there is a band pass filter 3 for the beat frequency signal resulting from the product of the second harmonic of the B-G grating and the fundamental of the R-G grating, (2 $W_1$-$W_2$) at 3.0 mHz. These filtered components of the beat frequency signal at ($W_2$-$W_1$) and (2 $W_1$-$W_2$) are applied to mixer 4. Band pass filter 5 is tuned to the sum frequency and thus extracts the sum frequency $W_1$ at 4.0 mHz which is the B-G synchronous signal 8. This signal at $W_1$ is then applied to mixer 6 along with signal 37 at ($W_2$-$W_1$). Band pass filter 7 is tuned to the sum frequency $W_2$ at 5.0 mHz which is the R-G synchronous signal 9. Thus, in addition to the previous signals discussed in connection with FIG. 1, synchronous reference signals at both color difference carrier frequencies are made available through the use of additional components of the beat frequency signal.

In the encoding grating filter of FIG. 2 the stripes of each grating are shown of equal width. This arrangement could not be used with the system of FIG. 1*a* since no second harmonic component would be generated. The stripes of the particular grating from which a second harmonic is derived must be of different widths. For example one stripe can be made half the width of the other so that one occupies 33.3% of the total period and the other 66.7%. In that case the second harmonic amplitude will be one half that of the fundamental.

Figure 3A:
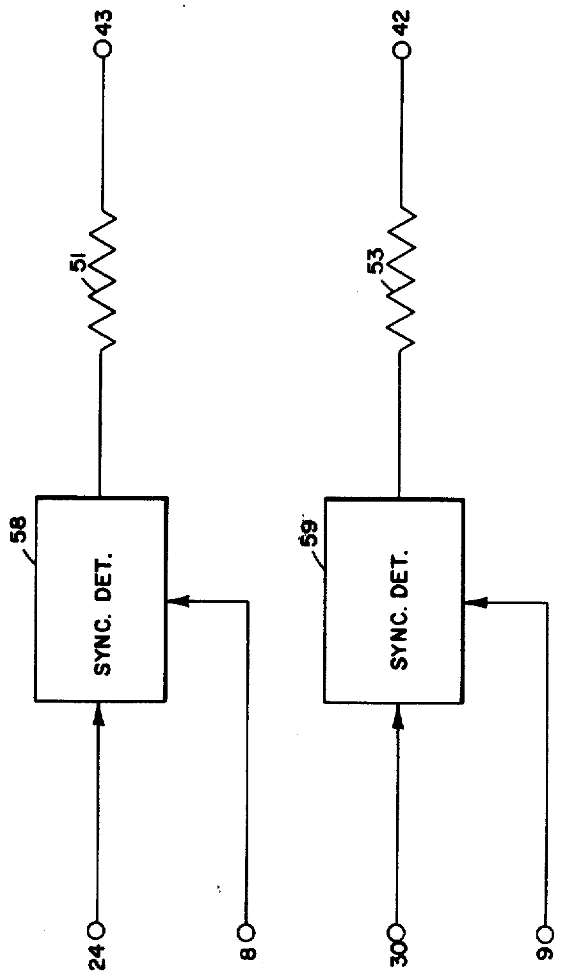
FIG. 3*a* is a block diagram illustrating an alternate embodiment for decoding the polarity for the system of FIG. 1*a*.

The synchronous reference signals developed by the system of FIG. 1*a*, 8 and 9, can be used in all of the embodiments which previously utilized the shaped beat frequency signal 39 without requiring integral relationships and parallelism of the gratings. In FIG. 3*a* a block diagram is shown which replaces the upper part of FIG. 3.

Synchronous detectors 58 and 59 derive the product of modulated color difference signals 24 and 30 and their associated reference signals 8 and 9. The polarity of the outputs 42 and 43 are used to actuate the polarity control switches as before. As with the system of FIG. 3, the reference signals 8 and 9 will become less reliable in areas where the green amplitude is relatively low. Here, to help in areas of low green content, the structure in the bottom half of FIG. 3 can be used with that of FIG. 3*a*. Thus when G becomes less than |R-G| or |B-G| or both, comparators 54 and 56 will couple positive signals through diodes 55 and 57 to form control signals 42 or 43 or both.

The structure of FIG. 3a can also be used to resolve the ambiguity in the system of FIG. 4. Here the structure of FIG. 3*a* again replaces the comparable sample and hold structure on the bottom of FIG. 4. Thus the output of synchronous detectors 58 and 59 replaces the output of sample and hold circuits 50 and 52. Thus, in the region where $(R\text{-}G)+(B\text{-}G)=0$, the polarity of the synchronous detector outputs are used to determine the output polarities. Although the bottom of FIG. 4 shows two sample and hold circuits for resolving the ambiguity, only a single one can be used along with a polarity inverter. This takes advantage of the fact that in the ambiguous region, it is known that R-G and B-G are of opposite polarity. Thus the output of sample and hold circuit 50 in FIG. 4 could be applied to an inverting amplifier in addition to being coupled to 43 via resistor 72. The inverting amplifier would then be coupled to 42 via resistor 73 to provide the other polarity determining signal. The same structure can be used if the synchronous detectors of FIG. 3*a* are used to resolve the ambiguity. A single synchronous detector such as 58 can be used to resolve one of the polarities while an inverting amplifier driver from the output of synchronous detector 58 is used to resolve the other polarity.

It is important to note that, although the second harmonic of one of the grating structures is involved in the decoding process, it is never directly resolved. The camera is only required to resolve the beat component between twice one grating frequency and the fundamental of the other. This frequency can be made within the spatial resolution of the camera and yet of high enough frequency to be of low visibility.

A combination arrangement can be used whereby only one rather than both of the color difference signals is derived using the methods of FIG. 3 and FIG. 3*a*. The developed control signal 43 is used to provide the correct B-G signal as shown in FIG. 1. To derive the second color difference signal, R-G, rather than use an additional sample and hold circuit, we make use of the sum of the color difference signals, 78, in FIG. 4. The B-G signal is subtracted from the sum signal 78 in an additional subtractor to form R-G. This R-G signal is then used as control signal 42 to provide the correct polarity R-G output. The only advantage this arrangement could have over those previously described is that only one of the carriers is sampled, rather than both. A situation could exist where one carrier, because of noise content, etc., is more suitable for direct sampling. Of course the comparator 54 in FIG. 3 can continue to be used for those cases where the beat frequency signal amplitude is relatively low.

Figure 5:
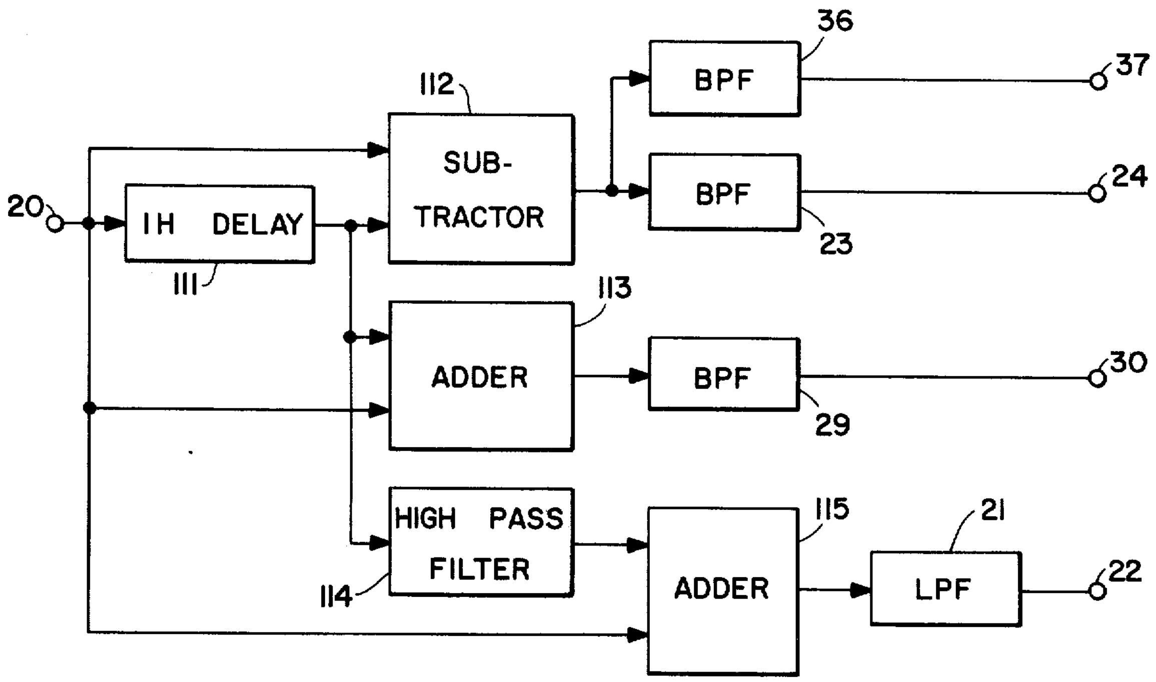
FIG. 5 is a block diagram illustrating a method of obtaining additional filtering of the desired signals.

A number of embodiments have been shown whereby the beat frequency signal resulting from the product of the two color difference gratings is used to determine the polarity of the color difference signals. It is desirable that this beat frequency signal be of relatively low visibility in the luminance or Y signal and at the same time be readily separable from the Y signal so that conventional luminance components do not interfere with it. It should be remembered that this latter requirement is relatively non-critical since this signal is never used directly as a color signal but only used in polarity determination. One method of minimizing the visibility of this beat frequency signal is to have the gratings at different angles as shown in FIG. 2. In this case, although the electrical beat frequency between the two gratings is relatively low, the spatial frequency of the beat is relatively high so as to be near the resolution limit of the system. In this case the visibility can be made low enough so as to be quite acceptable. In order to help separate the beat frequency signal from other luminance components, a relatively narrow band filter can be used with that signal. As shown in FIG. 1, filter 36 is narrower than the other band pass filters since it is used for polarity determination only. The filter shown has a 0.4 MHz bandwidth which is narrower than the 1.0 MHz bandwidth normally used for color difference signals. If further filtering of this beat frequency signal is desired, a one H delay line 111 can be used as shown in FIG. 5. Here the gratings are designed so that the beat frequency pattern is diagonal and changes 180° in phase on alternate scanning lines at each horizontal position. The camera output 20 is applied to the one H delay line 111 with both the input and output subtracted in subtractor 112. The majority of the luminance components, which are similar on alternate scan lines, are cancelled in subtractor 112, while the diagonal beat frequency signal is enhanced since opposite polarity signals exist at the ends of the one H delay line. This signal is passed onto band pass filter 36 as previously described. This same one H delay line can also be used to help filter the color difference signals and to minimize the visibility of undesired signals in the luminance output. An encoding filter as shown in FIG. 2 is used with one grating vertical and the other diagonal and changing in phase 180° on alternate scan lines at each horizontal position. In this case the beat frequency pattern will also change phase 180° on alternate scan lines so as to provide the desired filtering for this signal. In addition, as shown in FIG. 5, the lower frequency color difference signal is also derived from the subtractor 112 and applied to band pass filter 23 to provide signal 24. Thus signal 24 will also be relatively free of most of the undesired luminance components. To aid in the filtering of the vertical grating signal, the input and output of delay line 111 are added in adder 113 since this signal has the same polarity on alternate lines. The output of adder 113 is applied to band pass filter 29. The most significant grating visibility problems in the luminance signal is that due to the lower frequency grating and the beat frequency pattern. Since, in this case, both of these are diagonal they can be attenuated as shown in FIG. 5. These grating signals are transmitted by high pass filter 114 and added to the camera output in adder 115 where they are cancelled before being applied to low pass filter 21. The signal formed by the vertical grating is normally of a high enough frequency to be attenuated by low pass filter 21 without significantly reducing the luminance bandwidth. Only the high frequencies of the luminance signal are thus used to cancel the grating signals. If high pass filter 114 were removed and all signals were applied to adder 115, the vertical resolution of the system would significantly suffer. In the system of FIG. 5, a relatively high-quality wide-bandwidth, one H delay line is required. If, however, the delay line is used only to help isolate the beat frequency signal, only subtractor 112 connected to band pass filter 36 is used, with the other signals, as in FIG. 1, coming directly from the camera output 20. In this case a relatively inexpensive, narrow band delay line can be used. The $(2W_1-W_2)$ signal or $(2W_2-W_1)$ signal used in the systems of FIG. 1*a* and FIG. 3*a* are normally of high enough spatial frequency to be relatively invisible in the luminance presentation. To insure, however, that luminance components do not distort this signal the band pass filter 3 of FIG. 1a should be made relatively narrow. It can be made narrower than that of 36 since no envelope signals are derived from it. Thus the only limitations to its bandwidth are stability and the carry over of the signal from the previous scanning line.

The system of FIG. 5 shows only a single delay line. Additional filtering to achieve better isolation of the desired signal can be accomplished using a number of one H delay lines. Methods of this type are described in the publication "Encoding and Decoding of Color Information Using Two-Dimensional Spatial Filtering" by A. Macovski and L. F. Schaefer in the July 1972 issue of IEEE Transactions on Computers, Vol. C-21, No. 7.

Figure 6:
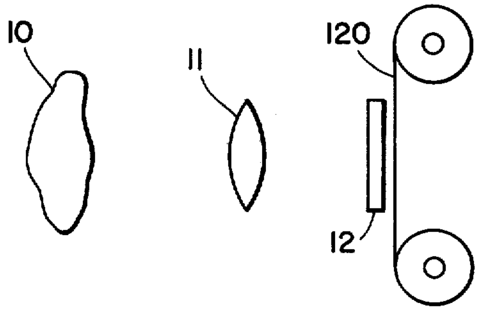
FIG. 6 illustrates an embodiment whereby color information is encoded onto a sensitized substrate.
Figure 7:
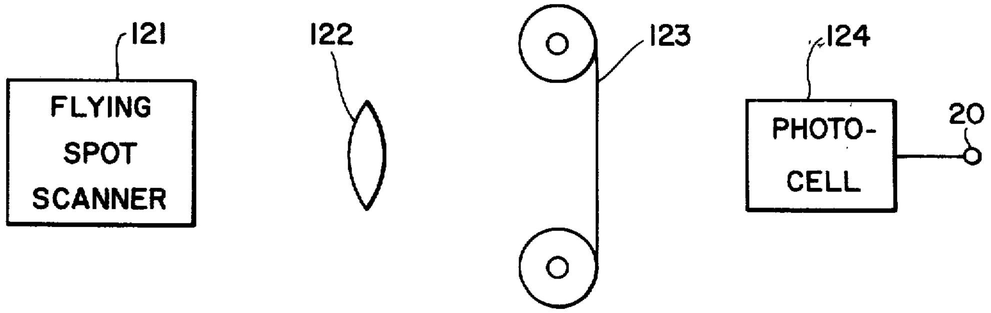
FIG. 7 illustrates a method of scanning an encoded surface to provide the desired composite signal.

In addition to encoding color information on the photocathode of a television camera, it can also be encoded on a photosensitive film as shown in FIG. 6. Color difference systems are particularly important in encoded film systems because of their inherent immunity to nonlinearities in the photographic process. Here object 10 is imaged using lens 11, through encoding filter 12 onto a photosensitive recording medium 120. Thus either still or motion pictures can be recorded as encoded color images where the recording medium itself need not have any color sensitivity and is thus inexpensive. The resultant recording, or a copy of it, is scanned to produce the desired signals. One scanning method is a television camera as shown in FIG. 1. The object 10 becomes the encoded image, the filters 19 and 12 are removed from camera 14, and the resultant signal 20 has the desired information. An alternative scanning arrangement is shown in FIG. 7 where the encoded recording is in the form of a transparency 123. A flying spot scanner 121 is imaged by lens 122 onto the encoded transparency 123 with the transmitted light collected by photocell 124. The resulting composite signal 20 can be used with any of the processing systems previously described for the camera system.

In the embodiments shown the color encoding filter 12 was always in close proximity to the photosensitive surface. Other imaging systems can be used. For example, a relay lens system can be used as illustrated in U.S. Pat. No. 3,647,948 granted to Y. Eto and M. Hibi on Mar. 7, 1972. Alternatively a coarse grating can be used in combination with a fine grating as described in U.S. Pat. No. 3,619,489 granted to H. F. Frohbach, A. Macovski, and P. J. Rice on Nov. 9, 1971. Any imaging system can be used where the image on the photosensitive surface is the product of the colored scene and the encoding filter.

What is claimed is:

1. Apparatus for encoding color information from a scene onto a photosensitive surface comprising:
   a first grating in the optical path between the scene and the photosensitive surface having alternate stripes each transmitting a different color whose projections onto the photosensitive surface produce equal response for white light from the scene; and
   a second grating, in substantially the same plane as the first grating, having alternate stripes of a different spatial frequency than those of the first grating, each transmitting a different color whose projections onto the photosensitive surface produce equal response for white light from the scene where at least one of the stripes of the second grating has a color different from any of those of the first grating and the colors of the stripes of the first and second gratings are such that the heat frequency grating pattern formed by the optical product of the first and second gratings has a polarity independent of the color of the scene.

2. Apparatus as cited in claim 1 wherein the first grating has alternate stripes of two of the subtractive color primaries and the second grating has alternate stripes of two of the subtractive color primaries, where one of the subtractive color primaries of the second grating is common to one of those of the first grating, whereby the heat frequency grating pattern amplitude is modulated by the color absorbed by the subtractive color primary common to the first and second grating.

3. Apparatus as cited in claim 2 wherein the first grating has alternate stripes colored cyan and magenta and the second grating has alternate stripes colored yellow and magenta whereby the beat frequency grating pattern is amplitude modulated by the green light in the scene.

4. Apparatus as cited in claim 1 including an overall color filter in the optical path between the scene and the photosensitive surface whose color transmission characteristic provides that the projections of the alternate stripes of the first and second gratings will each have equal response for white light from the scene on the photosensitive surface.

5. Apparatus as cited in claim 1 wherein the stripes of the first grating are parallel to those of the second grating and the ratios of the spatial frequencies of each grating to that of the difference frequency between the two gratings are integers.

6. Apparatus as cited in claim 1 where the alternate stripes of at least one of the two gratings are dissimilar in width whereby a second harmonic component is generated.

7. Apparatus as cited in claim 1 wherein the first grating stripes and the second grating stripes make different angles with the vertical whereby the visibility of the beat frequency grating pattern is reduced.

8. Apparatus as cited in claim 7 wherein the beat frequency grating pattern is diagonal and, when scanned in a television system, provides a reversed polarity on alternate scan lines at each horizontal position.

9. Apparatus as cited in claim 8 wherein the first grating pattern is diagonal and when scanned in a television system, provides a reversed polarity on alternate scan lines at each horizontal position, and the second grating pattern is vertical.

10. Apparatus for decoding the color scene information encoded on a recording surface, where a first color difference component amplitude modulates a first grating, a second color difference component amplitude modulates a second grating, and a color component of constant polarity amplitude modulates the beat frequency grating formed by the first and second grating, comprising:

means for scanning the recording surface whose output signal is a composite signal representative of the color scene information;

a low-pass filter whose input is the composite signal and whose output is a luminance signal;

a first filter means whose input is connected to the coomposite signal and whose output is a first modulated color difference signal;

a first detector means whose input is connected to the first modulated color difference signal and whose output is the absolute value of the first color difference signal;

switching means whose input is connected to the output of the first detector means and whose output provides either polarity of the absolute value of the first color difference signal in response to a first control signal;

a second filter means whose input is connected to the composite signal and whose output is a second modulated color difference signal;

a second detector means whose input is connected to the second modulated color difference signal and whose output is the absolute value of the second color difference signal;

switching means whose input is connected to the output of the second detector means and whose output provides either polarity of the absolute value of the second color difference signal in response to a second control signal;

third filter means whose input is connected to the composite signal and whose output provides one or more components of a modulated heat frequency signal whose amplitude is modulated by a constant polarity color signal; and means for utilizing components of the modulated heat frequency signal for generating the first and second control signals whereby the proper polarities of the first and second color difference signals will be provided.

11. Apparatus as cited in claim 10 wherein the means for utilizing the modulated heat frequency signal comprises:

a first sampler whose sampled signal input is the first modulated color difference signal and whose sampling signal input is the modulated heat frequency signal;

a first storage means whose input is connected to the output of the first sampler and whose output is the first control signal;

a second sampler whose sampled signal input is the second modulated color difference signal and whose sampling signal input is the modulated heat frequency signal; and a second storage means whose input is connected to the output of the second sampler and whose output is the second control signal.

12. Apparatus as cited in claim 11 including shaping means whose input is the modulated heat frequency signal and whose output is a constant amplitude pulse sequence which is the sampling signal input to the first and second samplers.

13. Apparatus as cited in claim 10 including:

detector means whose input is the modulated heat frequency signal and whose output is the constant polarity color signal;

a first comparator having as inputs the constant polarity color signal and the absolute value of the first color difference signal;

means for overriding the first control signal with a positive indicating control signal output from the first comparator when the amplitude of the absolute value of the first color difference signal exceeds that of the constant polarity color signal;

a second comparator having as inputs the constant polarity color signal and the absolute value of the second color difference signal; and means for overriding the second control signal with a positive indicating control signal output from the second comparator when the amplitude of the absolute value of the second color difference signal exceeds that of the constant polarity signal.

14. Apparatus as cited in claim 10 wherein the third filter means includes:

a first heat frequency filter for extracting a first heat frequency signal derived from the product of the fundamental components of the first and second gratings; and a second heat frequency filter for extracting a second heat frequency signal derived from the product of the second harmonic component of the first grating and the fundamental component of the second grating.

15. Apparatus as cited in claim 14 wherein the means for utilizing components of the beat frequency signal comprises:

a first mixer having as inputs the first and second beat frequency signals of putting out a first reference signal whose frequency is the sum of the first and second beat frequency signal frequencies;

a second mixer having as inputs the first reference signal and the first beat frequency signal for putting out a second reference signal whose frequency is the sum of the first reference signal frequency and the first beat frequency signal frequency;

a first synchronous detector, whose inputs are the first modulated color difference signal and the first reference signal, whose output provides the first control signal; and a second synchronous detector, whose inputs are the second modulated color difference signal and the second reference signal, whose output provides the second control signal.

16. Apparatus as cited in claim 10 wherein the means for utilizing the modulated heat frequency signal includes:

a detector whose input is the modulated heat frequency signal and whose output is the constant polarity color signal; and a subtractor to subtract the constant polarity color signal from the luminance signal whose output is the weighted sum of the first and second color difference signals.

17. Apparatus as cited in claim 16 including:

a first adder for adding the positive absolute value of the first color difference signal to the positive absolute value of the second color difference signal;

a second adder for adding the positive absolute value of the first color difference signal to the negative absolute value of the second color difference signal;

a third adder for adding the negative absolute value of the first color difference signal to the positive absolute value of the second color difference signal;

a fourth adder for adding the negative absolute value of the first color difference signal to the negative absolute value of the second color difference signal;

multiple comparator means whose outputs are the subtractor output and the output of the first, second, third and fourth adders;

means for generating a positive indicating first control signal and a positive indicating second control signal when the subtractor output substantially equals that of the first adder output;

means for generating a positive indicating first control signal and a negative indicating second control signal when the subtractor output substantially equals that of the second adder output;

means for generating a negative indicating first control signal and a positive indicating second control signal when the subtractor output substantially equals that of the third adder output; and means for generating a negative indicating first control signal and a negative indicating second control signal when the subtractor output substantially equals that of the fourth adder output.

18. Apparatus as cited in claim 17 including:

a sampler whose sampled input is the first modulated color difference signal and whose sampling input is the modulated heat frequency signal;

a storage means connected to the output of the sampler; and means for overriding the first control signal output of the multiple comparator with the stored output of the sampler when the second adder output and the third adder output substantially equals the subtractor output.

19. Apparatus as cited in claim 17 including:

a mixer whose inputs are components of the modulated heat frequency signal consisting of a first component derived from the product of the fundamental components of the two gratings and a second component deriving from the product of the second harmonic of the first grating and the fundamental of the second grating, and whose output is a reference signal whose frequency is the sum of the frequencies of the modulated heat frequency signal components;

a synchronous detector whose inputs are the first modulated color difference signal and the reference signal; and means for overriding the first control signal output of the multiple comparator with the output of the synchronous detector when both the second adder output and the third adder output substantially equal the subtractor output.

20. Apparatus as recited in claim 16 including:

a sampler whose sampled input is the first modulated color difference signal and whose sampling input is the modulated heat frequency signal;

storage means connected to the output of the sampler whose stored output is the first control signal;

a second subtractor for subtracting the first color difference signal from the output of the subtractor whose output is the second color difference signal; and means for utilizing the output of the second subtractor as the second control signal.

21. Apparatus as cited in claim 20 including:

a comparator whose inputs are the constant polarity color signal and the absolute value of the first color difference signal; and means for overriding the stored sampler output with a positive industry first control signal when the comparator indicates that the amplitude of the absolute value of the first color difference signal exceeds that of the constant polarity color signal.

22. Apparatus as cited in claim 16 including:

A mixer whose inputs are components of the modulated heat frequency signal consisting of a first component derived from the product of the fundamental componets of the two gratings and a second component derived from the product of the second harmonic of the first grating and the fundamental of the second grating, and whose output is a reference signal whose frequency is the sum of the frequencies of the modulated heat frequency signal components;

a synchronous detector whose inputs are the first modulated color difference signal and the reference signal and whose output is the first control signal;

a second subtractor which subtracts the first color difference signal from the output of the subtractor whose output is the second color difference signal; and mean for utilizing the output of the second subtractor as the second control signal.

23. Apparatus as cited in claim 22 including:

a comparator whose inputs are the constant polarity signal and the absolute value of the first color difference signal; and means for overriding the synchronous detector output with a positive indicating control signal from the comparator output when the amplitude of the absolute value of the first color difference signal exceeds that of the constant polarity color signal.

24. Apparatus as cited in claim 10 wherein the third filter means has a bandwidth less than that of the first and second filter means.

25. Apparatus as recited in claim 10 including a delay line whose time delay is substantially the time of one scanning line wherein the composite signal is connected to the input of the delay line, and the input and output of the delay line are combined in a subtractor whose output is connected to the third filter means whereby the modulated heat signal is enhanced.

26. Apparatus as cited in claim 25 wherein the input and output of the delay line are further combined in a second subtractor whose output is connected to the first filter means whereby the first modulated color difference signal is enhanced.

27. Apparatus as recited in claim 25 wherein the input and output of the delay line are combined in an adder whose output is connected to the second filter means whereby the second modulated color difference signal is enhanced.

28. Apparatus as recited in claim 25 wherein the input and output of the delay line are combined in an adder whose output is connected to the low pass filter whereby the modulated heat frequency signal and the first color difference signal are attenuated in the luminance signal.

29. Apparatus as recited in claim 10 wherein the first color difference signal represents the difference between two primary colors, the second color difference signal represents the difference between two primary colors where one of the colors is common to one of the colors of the first color difference signal, and the constant polarity color signal represents the primary color common to the first and second color difference signals.

30. Apparatus recited in claim 29 wherein the first color difference signal represents R-G, the second color difference signal represents B-G and the constant polarity color signal represents G.

31. Apparatus as recited in claim 10 wherein the recording surface is the photocathode of a television camera tube and the means for scanning the recording surface is the scanned electron beam of the television camera tube.

32. Apparatus as recited in claim 10 wherein the recording surface is a reproduction of the encoded color scene information and the means for scanning the recording surface is a television camera imaged on the reproduction.

33. Apparatus as recited in claim 10 wherein the recording surface is a transparency and the means for scanning the recording surface is a flying spot scanner imaged on the transparency with a photocell used to collect the transmitted light.

34. Apparatus as recited in claim 10 including a matrix circuit whose inputs are the first and second color difference signals and whose outputs are the standard color television signals.

35. A color television camera having a lens and a photocathode comprising:

a first grating in the optical path between the lens and the photocathode having alternate stripes each transmitting a different color and whose projections onto the photocathode produce equal response for white light;

a second grating in substantially the same plane as the first grating, having alternate stripes of a different spatial frequency than those of the first grating, each transmitting a different color, whose projections onto the photocathode produce equal response for white light, where at least one of the stripes of the second grating has a color different from any of those of the first grating, and the colors of the stripes of the first and second gratings are such that the beat frequency grating pattern formed by the optical product of the first and second gratings has a fixed polarity;

means for scanning the photocathode to produce a composite signal;

a low pass filter whose input is connected to the composite signal and whose output is a luminance signal;

a first filter means whose input is connected to the composite signal and whose output is a first modulated color difference signal;

a first detector means whose input is the first modulated color difference signal and whose output is the absolute value of the first color difference signal;

means for providing either polarity of the absolute value of the first color difference signal in response to a first control signal, a second filter means whose input is connected to the composite signal and whose output is a second modulated color difference signal;

a second detector means whose input is the second modulated color difference signal and whose output is the absolute value of the second color difference signal;

means for providing either polarity of the absolute value of the second color difference signal in response to a second control signal;

third filter means whose input is the composite signal and whose output is one or more components of a modulated heat frequency signal; and means for utilizing components of the modulated heat frequency signal for generating the first and second control signals whereby the proper polarities of the first and second color difference signals will be provided.

* * * * *